(12) United States Patent
Evans et al.

(10) Patent No.: US 10,019,347 B2
(45) Date of Patent: Jul. 10, 2018

(54) SYSTEMS AND METHODS FOR SELECTION OF TEST CASES FOR PAYMENT TERMINALS

(71) Applicant: MASTERCARD INTERNATIONAL INCORPORATED, Purchase, NY (US)

(72) Inventors: Paul Evans, Hampshire (GB); Paul Vanneste, Ottignies (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 158 days.

(21) Appl. No.: 14/940,507

(22) Filed: Nov. 13, 2015

(65) Prior Publication Data
US 2016/0140026 A1 May 19, 2016

(30) Foreign Application Priority Data
Nov. 14, 2014 (EP) ..................... 14193258

(51) Int. Cl.
*G06F 11/36* (2006.01)
*G06F 11/07* (2006.01)
(Continued)

(52) U.S. Cl.
CPC ............ *G06F 11/3684* (2013.01); *G06F 8/34* (2013.01); *G06F 11/3676* (2013.01);
(Continued)

(58) Field of Classification Search
CPC ............... G06F 11/263; G06F 11/3688; G06F 11/3676; G06F 11/3684; G06F 11/368;
(Continued)

(56) References Cited

U.S. PATENT DOCUMENTS 5,600,789 A * 2/1997 Parker ................. G06F 11/3688
714/38.11
6,836,766 B1 * 12/2004 Gilpin .................... G06Q 10/06
703/19
(Continued)

OTHER PUBLICATIONS

Yu Lei et al., IPOG: A General Strategy for T-Way Software Testing, IEEE 0-7695-2772-8/07, 2007, [Retrieved on Feb. 12, 2018]. Retrieved from the internet: <URL: http://ieeexplore.ieee.org/stamp/stamp.jsp?tp=&arnumber=4148973> 8 Pages (1-8) (Year: 2007).*

(Continued)

*Primary Examiner* — Anibal Rivera
(74) *Attorney, Agent, or Firm* — Harness, Dickey & Pierce, P.L.C.

(57) ABSTRACT

The present disclosure proposes a computer implemented method for selecting test cases to be executed on a terminal by creating a configuration code and applying this code to a set of test case selection tuples. The present disclosure also proposes a method for automatically creating a set of test case selection tuples, taking a source code as an input. The created set of test case selection tuples can be used in the above-mentioned method for selecting test cases. Finally, the present disclosure proposes a method for operating a program for selecting test cases having a user interface and a selection logic. The program may apply the above-mentioned method for selecting test cases by creating a configuration code and applying this code to a set of test case selection tuples.

8 Claims, 5 Drawing Sheets

(51) Int. Cl.
*G06F 9/44* (2018.01)
*G06F 17/50* (2006.01)
*G06F 8/34* (2018.01)
*G06F 17/30* (2006.01)

(52) U.S. Cl.
CPC ...... *G06F 11/3688* (2013.01); *G06F 11/3692* (2013.01); *G06F 11/3624* (2013.01); *G06F 11/3664* (2013.01); *G06F 17/30303* (2013.01)

(58) Field of Classification Search
CPC .. G06F 11/3672; G06F 11/28; G06F 11/2273; G06F 11/36; G06F 8/34; G06F 17/30303; G06F 17/5022; G06F 11/3664; G06F 11/261; G06F 11/3624; G06F 11/3457; G06F 9/44505
See application file for complete search history.

(56) References Cited

U.S. PATENT DOCUMENTS

| Patent/Pub. No. | Date | Inventor | Classification |
|---|---|---|---|
| 8,065,661 B2* | 11/2011 | Sattler | G06F 11/3688 714/38.1 |
| 8,161,449 B2* | 4/2012 | Bhinge | G01R 31/31835 716/100 |
| 8,276,123 B1* | 9/2012 | Deng | G06F 11/3688 714/37 |
| 8,850,393 B2* | 9/2014 | Castro | G06F 11/3688 714/38.1 |
| 2002/0116507 A1* | 8/2002 | Manjure | H04L 43/50 709/229 |
| 2004/0073890 A1* | 4/2004 | Johnson | G06F 11/3672 717/124 |
| 2005/0166094 A1* | 7/2005 | Blackwell | G06F 11/3664 714/38.14 |
| 2005/0203717 A1* | 9/2005 | Parimi | G06F 11/263 702/188 |
| 2006/0224919 A1* | 10/2006 | McIver | G06F 11/3457 714/12 |
| 2006/0271322 A1* | 11/2006 | Haggerty | G06F 11/2273 702/108 |
| 2007/0174701 A1* | 7/2007 | Lee | G06F 11/263 714/33 |
| 2008/0010542 A1* | 1/2008 | Yamamoto | G06F 11/3672 714/38.1 |
| 2008/0126448 A1* | 5/2008 | Sattler | G06F 11/3688 |
| 2008/0206731 A1* | 8/2008 | Bastianova-Klett | G09B 7/00 434/322 |
| 2009/0006066 A1* | 1/2009 | Behm | G06F 11/261 703/15 |
| 2009/0307763 A1* | 12/2009 | Rawlins | G06F 9/44505 726/5 |
| 2010/0042959 A1* | 2/2010 | Bhinge | G01R 31/31835 716/136 |
| 2010/0088278 A1* | 4/2010 | Wood | G01R 31/31835 707/638 |
| 2010/0095159 A1* | 4/2010 | Jeong | G06F 11/263 714/38.1 |
| 2010/0229155 A1* | 9/2010 | Adiyapatham | G06F 11/3672 717/124 |
| 2011/0010685 A1* | 1/2011 | Sureka | G06F 8/34 717/102 |
| 2011/0035631 A1* | 2/2011 | Bhinge | G01R 31/31835 714/48 |
| 2011/0161936 A1* | 6/2011 | Huang | G06F 11/3688 717/130 |
| 2011/0184689 A1* | 7/2011 | Awedikian | G06F 11/3684 702/123 |
| 2012/0117545 A1* | 5/2012 | Yokoi | G06F 11/3624 717/126 |
| 2012/0150820 A1* | 6/2012 | Sankaranarayanan | G06F 17/30303 707/690 |
| 2012/0226465 A1* | 9/2012 | Mizuno | G06F 11/3684 702/123 |
| 2012/0317534 A1* | 12/2012 | Bhinge | G01R 31/31835 716/136 |
| 2013/0159963 A1* | 6/2013 | Dhalait | G06F 11/368 717/104 |
| 2013/0311128 A1* | 11/2013 | Takano | G06F 11/3684 702/123 |
| 2013/0318402 A1* | 11/2013 | Rapp | G06F 11/3672 714/38.1 |
| 2014/0075415 A1* | 3/2014 | Goldish | G06F 11/3684 717/124 |
| 2014/0211021 A1* | 7/2014 | Roh | G06K 9/68 348/187 |
| 2015/0026664 A1* | 1/2015 | Bartley | G06F 11/3676 717/124 |
| 2015/0113330 A1* | 4/2015 | Grondin | G06F 11/3684 714/38.1 |
| 2015/0264590 A1* | 9/2015 | Michl | H04W 24/06 455/67.14 |

OTHER PUBLICATIONS

Massimiliano Di Penta et al., Search-based Testing of Service Level Agreements, ACM 978-1-59593-697-4/07/0007, 2007, [Retrieved on Feb. 12, 2018]. Retrieved from the internet: <URL: https://dl.acm.org/citation.cfm?id=1277174> 8 Pages. (1090-1097) (Year: 2007).*

"Automated Test Case Selection Using Feature Model: An Industrial Case Study"; S. Wang, A. Gotlieb, S. Ali and M. Liaaen; Certus Software V&V Center, Simula Research Laboratory, Norway; Department of Informatics, University of Oslo, Norway, Cisco Systems, Inc., Norway; © Springer-Verlag Berlin Heidelberg 2013; pp. 237-253.

"Impact Analysis of Configureation Changes for Test Case Selection"; X. Qu, M. Acharya dnd B. Robinson; 2011 22nd IEEE Interantional Symposium on Software Reliability Engineering; pp. 140-149.

* cited by examiner

| Test Case Reference | Comparison Value Set | Mask |
|---|---|---|
| Test Case 3 | 0000 | 0000 |
| Test Case 1 | 0010 | 0010 |
| Test Case 4 | 0000 | 0010 |
| Test Case 2 | 0011 | 1011 |

Fig. 2

| Configuration Code | Configuration Code and Mask | In Scope |
|---|---|---|
| 0111 | 0000 | True |
| 0111 | 0010 | True |
| 0111 | 0010 | False |
| 0111 | 0011 | True |

Fig. 3

SYSTEMS AND METHODS FOR SELECTION OF TEST CASES FOR PAYMENT TERMINALS

CROSS-REFERENCE TO RELATED APPLICATION

This application claims the benefit of and priority to European Patent Application No. 14193258.2 filed Nov. 14, 2014. The entire disclosure of the above application is incorporated herein by reference.

CROSS-REFERENCE TO RELATED APPLICATION

This application claims the benefit of and priority to European Patent Application No. 14193258.2 filed Nov. 14, 2014. The entire disclosure of the above application is incorporated herein by reference.

FIELD

The present disclosure generally relates to systems and methods for selection of test cases for payment terminals.

BACKGROUND

This section provides background information related to the present disclosure which is not necessarily prior art.

Payment terminals, such as credit card readers in stores or in ATMs or payment apps on mobile devices which use credit card credentials, require extensive testing in order to ensure compliance with rules of credit card companies and banks as well as with government regulations. This testing is performed by test case performers, which are entities seeking to provide businesses and the like with payment terminals, such as manufacturers or programmers of such terminals. By performing the testing, test case performers can obtain certification for their terminals which allows them to offer the payment terminals for financial transactions. To test the compliance of the terminals, test case performers execute test cases which simulate possible payment situations and which are based on the rules and regulations the terminal being tested has to comply with. Test cases are provided by test case suppliers, which are financial institutions such as banks or credit card companies, which provided the financial transaction infrastructure used for financial transactions by the payment terminals. To select the correct test cases for a given terminal, a test case performer has to compare a terminal's configuration, which determines which rules and regulations apply, with the possible test cases in order to select the necessary test cases to verify the payment terminal's compliance. Rules and regulations for payment terminals differ globally. Therefore, a large number of rules and regulations exist, leading to a vast number of possible test cases for payment terminals. Currently, test case performers choose the required test cases by consulting a look-up table provided by the test case suppliers, which lists, for all possible test cases, all requirements a test case can check. A test case performer first needs to determine all aspects of the terminal which are to be tested and then needs to compare these aspects with each test case in the look-up table. This way of selecting test cases is error-prone, complicated and time-consuming. Furthermore, it can result in executing more test cases than necessary since certain terminal configurations can be checked with multiple test cases, while only one would be necessary to run. The test case performer will most likely not realize this due to the size of the look-up table and will therefore run too many test cases. There is also a danger that the test case performer could miss a test case that could result in a faulty terminal being used in a production environment.

SUMMARY

This section provides a general summary of the disclosure, and is not a comprehensive disclosure of its full scope or all of its features. Aspects and embodiments of the disclosure are also set out in the accompanying claims.

The above-mentioned drawbacks of the prior art can be overcome by the present disclosure which proposes a computer implemented method for selecting test cases to be executed on a terminal, by creating a configuration code and applying this code to a set of test case selection tuples. The present disclosure also proposes a method for automatically creating a set of test case selection tuples, taking a source code as an input. The created set of test case selection tuples can be used in the above-mentioned method for selecting test cases. Finally, the present disclosure proposes a method for operating a program for selecting test cases having a user interface and a selection logic. The program may apply the above-mentioned method for selecting test cases by creating a configuration code and applying this code to a set of test case selection tuples. In particular, the proposed methods enable the test case providers to provide the test case to test case performers with an optimized table. This optimized table comprises information pertaining to the test cases in a way that is adapted to be used by a computer implemented method for selecting test cases based on the configuration of the terminal-under-test.

A first embodiment of the disclosure provides a computer-implemented method for selecting test cases to be executed on a terminal, comprising the steps of creating a configuration code representing a configuration of the terminal, wherein the code comprises one or more entries and wherein each entry of the code represents an aspect of the configuration of the terminal; and applying the configuration code to a set of test case selection tuples, wherein each test case selection tuple comprises a mask, a corresponding comparison value set and a test case reference, said application comprising, for each test case selection tuple in the set, the steps of using the mask for identifying the entries of the configuration code which are to be compared with the corresponding comparison value set, comparing the values of the identified entries with respective values of the comparison value set and selecting the test case for execution on the terminal if each of the values of the identified entries corresponds to the respective value of the comparison value set. The configuration code representing a configuration of the terminal is applied to the set of test case selection tuples, which carries the information about the test case selection rules, i.e. the information about which test cases are to be selected for a given configuration of the terminal. In particular, the method enables the test case providers to provide the test case performers with an optimized table. This optimized table comprises information pertaining to the test cases in a way that is adapted to be used by a computer implemented method for selecting test cases based on the configuration of the terminal-under-test. This method provides for an automatic, computer implemented way of selecting test cases, e.g. for payment terminals. It reduces the steps a test case performer has to perform himself during the selection process.

According to a second embodiment of the disclosure, in the first embodiment, the configuration of the terminal comprises an acquiring environment.

According to a third embodiment of the disclosure, in any of the preceding embodiments, the configuration code representing the configuration of the terminal is a bitmap and the entries comprised by the configuration code are the bits of the bitmap with each bit representing a Boolean fact relating to the terminal configuration. Using bitmaps allows for a particularly efficient and easy implementation of the test case selection method on computing devices, in particular of the encoding of the information representing a configuration of the terminal, and of the masking and comparison operations, namely by Boolean operations.

According to a fourth embodiment of the disclosure, in the third embodiment, the mask is used for identifying the entries by applying Boolean AND to each value of the mask and each corresponding entry of the configuration code.

According to a fifth embodiment of the disclosure, in the third and fourth embodiments, the values of the identified entries of the configuration code are compared to the respective values of the comparison value set by applying a Boolean comparison to each identified entry and each respective value.

According to a sixth embodiment of the disclosure, in any of the preceding embodiments, all test case selection tuples comprise different test case selection references. This reduces, for a given number of different test cases to be selected, the number of tuples to which the configuration code has to be applied, or, for a given number of tuples, it avoids that the same test case is selected several times, which in the end reduces the time required to test a terminal.

A seventh embodiment of the disclosure provides a method for creating a set of test case selection tuples for selecting test cases to be executed on a terminal, wherein each test case selection tuple comprises a mask, a corresponding comparison value set and a test case reference, the method comprising the steps of taking as an input a source code which defines options for the configuration of the terminal, and test case selection rules for selecting the test cases for the terminal, wherein the test case selection rules determine the test cases to be executed on the terminal in dependence on the configuration of the terminal, and compiling the source code, wherein the set of test case selection tuples is generated as an output. The created set of test case selection tuples, which carries the information about the test case selection rules, enables the test case providers to provide the test case performers with an optimized table. This optimized table comprises information pertaining to the test cases in a way that is adapted to be used by a computer implemented method for selecting test cases based on the configuration of the terminal-under-test. For example, the processing on the test case performer side can be done by using the method for selecting test cases according to the first to sixth embodiment of the disclosure. Defining the test case selection rules in source code and then compiling that source code to create the set of test case selection tuples provides a simple, error-prone way of obtaining the set of test case selection tuples. Furthermore, if the selection rules change, the set of test case selection tuples can quickly be updated by reflecting the changes in the human readable source code. The source code will typically be written by the test case provider, who has knowledge about possible terminal capabilities and about the test cases to be selected for execution for a given configuration of the terminal.

According to an eighth embodiment of the disclosure, in the seventh embodiment, the source code further defines the test cases, and the step of compiling further generates the test cases as an output.

According to a ninth embodiment of the disclosure, in the seventh and eighth embodiments, the source code is written in a programming language specifically designed for defining options for the configuration of a terminal and rules for selecting the test cases for the terminal in dependence on the configuration of the terminal. Providing a programming language with a syntax adapted to the logic requirements of the test case selection rules makes it easier for a user to encode these rules.

According to a tenth embodiment of the disclosure, in the seventh to ninth embodiments, the source code further defines rules for the configuration of the terminal, and the step of compiling the source code further generates the configuration code rules. The configuration code rules carry in encoded form the information about possible configurations of the terminal. They may also carry the information for the creation of questions answering which allows a user, typically a test case test case performer, to define the configuration of the terminal. They may also define the rules for the creation of a configuration code in dependence on the configuration of the terminal. Defining the rules for the configuration of the terminal in source code and then compiling that source code to create configuration code rules provides a simple way of obtaining the configuration code rules. Furthermore, if the rules for the configuration of the terminal change, the configuration code rules can quickly be updated by reflecting the changes in the human readable source code.

According to an eleventh embodiment of the disclosure, in the tenth embodiment, the configuration code rules define which aspects of the configuration of the terminal are to be comprised in the configuration code and which part of the configuration code relates to which aspect.

According to a twelfth embodiment of the disclosure, in the tenth or eleventh embodiment, the configuration code rules comprise at least one configuration suggestion tuple having a partial code representing a configuration of the terminal and a suggested configuration value, wherein the partial code is based on possible configurations and wherein the suggested configuration value is based on the partial code. These suggested configuration values may allow speeding up the generation of the configuration codes of the terminals.

According to a thirteenth embodiment of the disclosure, in the twelfth embodiment, the suggested configuration value is a proposed configuration of the terminal.

According to a fourteenth embodiment of the disclosure, in the twelfth or thirteenth embodiments, the suggested configuration value is an unchangeable, mandatory configuration.

According to a fifteenth embodiment of the disclosure, in the twelfth or thirteenth embodiments, the suggested configuration value includes an aspect of the configuration which is not required to be specified.

According to a sixteenth embodiment of the disclosure, in the tenth to fifteenth embodiments, the configuration code rules comprise at least one critical configuration tuple having a partial code representing a configuration of the terminal and a critical configuration value, wherein the partial code is based on possible configurations and wherein the critical configuration value is based on the partial code. The critical configuration value can prevent the creation of erroneous configuration codes by helping to detect invalid configuration codes According to a seventeenth embodiment of the disclosure, in the sixteenth embodiment, the critical configuration value denotes a configuration which results in a warning, wherein the warning indicates a potentially invalid configuration of the terminal.

According to an eighteenth embodiment of the disclosure, in the sixteenth embodiment, the critical configuration value denotes a configuration which results in an error, wherein the error indicates an invalid configuration of the terminal and wherein the error prohibits an invalid configuration of the terminal.

A nineteenth embodiment of the disclosure provides a method for operating a test case selection program having a user interface and a selection logic, comprising the steps of providing, through the user interface, questions answering which allows a user to define the configuration of the terminal, receiving user input defining the configuration of the terminal, and selecting, with the help of the selection logic, the test cases to be executed based on the configuration of the terminal and a set of test case selection tuples, wherein each test case selection tuple comprises a mask, a corresponding comparison value set and a test case reference. Ideally, the user, who is typically a test case performer, will only have to answer the set of questions and will then automatically be presented with the test cases to be executed on the terminal. The test case providers provide information pertaining to the test cases to the program in a format which can be easily parsed by the program and which allows the program to easily and efficiently select the test cases to be executed based on the answers the test case performers provide.

According to a twentieth embodiment of the disclosure, in the nineteenth embodiment, the set of test case selection tuples is generated by the method according to the seventh to eighteenth embodiment.

According to a twenty-first embodiment of the disclosure, in the nineteenth or twentieth embodiments, the step of selecting the test cases to be executed comprises the steps of the method according to the first to the sixth embodiment, wherein the step of creating the configuration code is carried out in dependence of the configuration of the terminal.

According to a twenty-second embodiment of the disclosure, in the nineteenth to twenty-first embodiments, the questions provided by the user interface are based on configuration code rules generated by the method according to any one of the tenth to eighteenth embodiment. Providing questions based on the configuration code rules provides an intuitive way for a user to generate the configuration code of the terminal since the user only needs to answer questions and does not have to concern himself how each aspect of a terminal is reflected in the configuration code.

According to a twenty-third embodiment of the disclosure, in the twenty-first to twenty-second embodiments, the creation of the configuration code is based on configuration code rules generated by the method according to any one of the tenth to the eighteenth embodiments.

According to a twenty-fourth embodiment of the disclosure, in any of the preceding embodiments, the set of test case selection tuples is stored in a table having a column each for the masks, the comparison value sets and the test case selection references for each of the test case selection tuples. Storing the test case selection tuples in a table allows performing the test case selection method based on table processing which is easy to implement on computing devices.

A twenty-fifth embodiment of the disclosure provides a computing device comprising a processor and a memory and being configured to perform the methods according to any one of the first to twenty-fourth embodiment.

A twenty-sixth embodiment of the disclosure provides a computer program having instructions which when executed by a computing device cause the computing device to perform the methods according to any one of the first to twenty-fourth embodiment.

A twenty-seventh embodiment of the disclosure provides a test case selection program generated in accordance with the method of any one of the nineteenth to twenty-fourth embodiment.

A twenty-eighth embodiment of the disclosure provides a computer readable medium having stored thereon a computer program according to any one of the twenty-sixth or twenty-seventh embodiment.

A twenty-ninth embodiment of the disclosure provides a data stream which is representative of a computer program according to any one of the twenty-sixth or twenty-seventh embodiment.

Details of the disclosure, its implementation and its advantages are set forth in the accompanying drawings and the description below. Further features, aspects and potential advantages will be apparent from the description, drawings and the claims.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 shows an exemplary embodiment of a test case selection table.

FIG. 3 shows an example application of an example configuration code to the content of the exemplary test case selection table of FIG. 2.

Like reference signs in the various drawings indicate like elements.

DETAILED DESCRIPTION

Example embodiments will now be described more fully with reference to the accompanying drawings.

Figure 1:
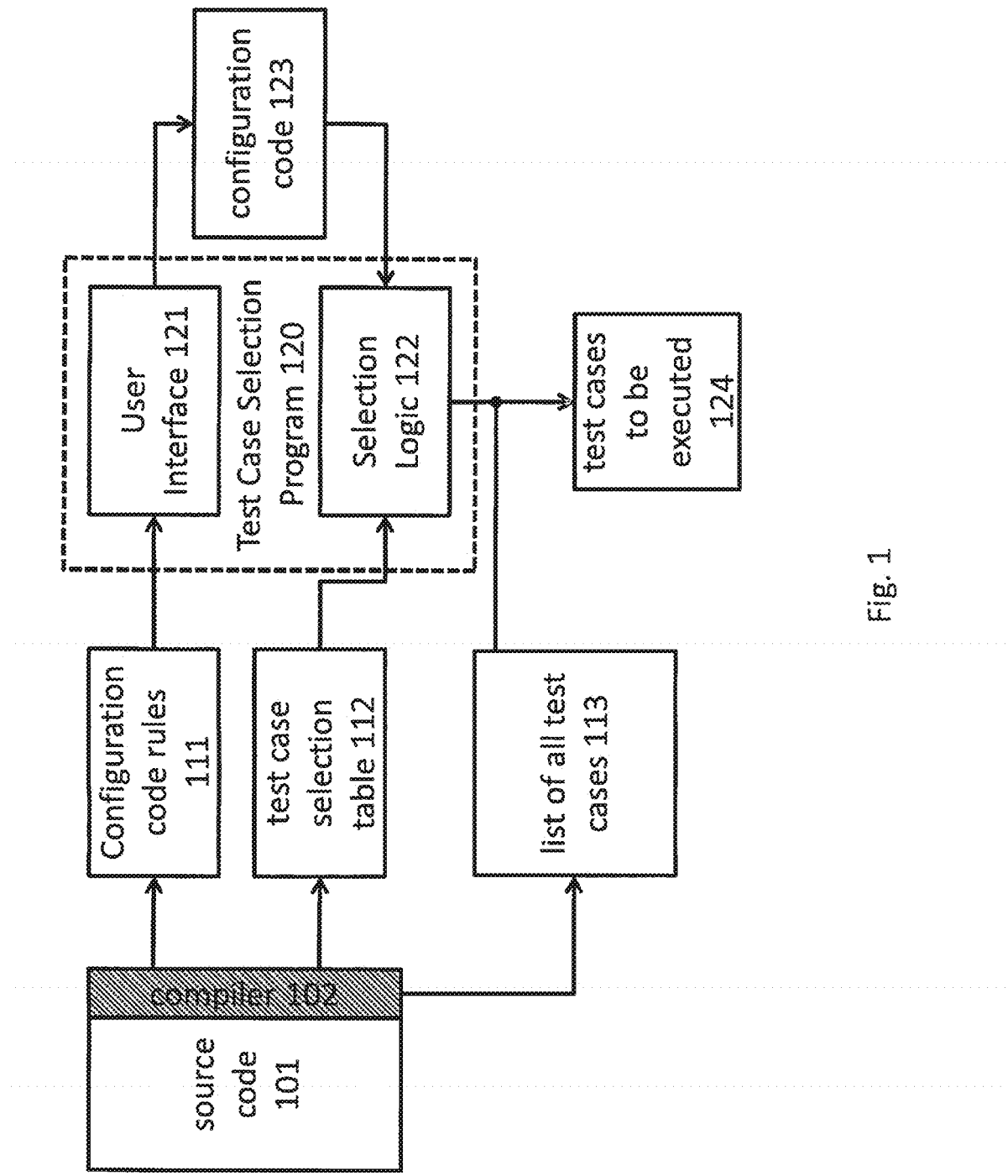
FIG. 1 shows a block diagram illustrating an exemplary embodiment of the components of a system implementing the test case selection method, the method for creating a set of test case selection tuples, and the method for operating a test case selection program.

The present disclosure will now be described with regard to FIG. 1. Source code 101 defines rules for selecting the test cases 113. It may also define options for the configuration of a terminal. Within the context of the present disclosure, the expression "terminal" includes but is not limited to any kind of payment terminal, such as a credit card reader in a store or a mobile payment app on a portable device.

The test case selection rules determine the test cases to be executed on the terminal in dependence on the configuration of the terminal. Test cases may be a set of instructions which comprise, for example, instructions regarding the kind of test card or test card credentials to be used, the amount of a test payment transaction and certain kinds of input to be made on the terminal. The test cases can test all possible options for the configuration of the terminal. Thus, the test case selection rules are a set of rules which compares the options chosen for a terminal configuration with a set of test cases. An example of a test case will be explained in detail with regard to FIG. 5.

Options for the configuration of a terminal which may be defined by the source code 101 may include, for example, the different types of payment cards or devices which can be used with the terminal. They may also include the terminal types such as a physical terminal for swiping credit cards, for reading a credit card's chip, or for contactless payment, or a payment application on mobile devices. Furthermore, they may include rules of the banks which issued the credit cards, and government regulations for payment transactions. The configuration of the terminal can also comprise an acquiring environment of the terminal. The acquiring environment defines the environment of the terminal, i.e. whether the terminal is located in an ATM or a store or in a portable or stationary device and can comprise other parameters such as the type of connection of the terminal to the payment network via the Internet or via a landline.

In one example embodiment, source code 101 can also define the test cases 113.

The source code 101 can be written in any general purpose programming language. However, in one example embodiment of the present disclosure, the source code 101 is written in a programming language specifically designed for defining options for the configuration of the terminal and rules for selecting the test cases 113 for the terminal in dependence on the configuration of the terminal.

The source code 101 is compiled by a compiler 102, which can be any computer program adapted to create test case selection tuples 112 and optionally configuration code rules 111 from source code 101. In case the test cases are defined by the source code 101, the compiler 102 also needs to be adapted to transform source code 101 into a source code which is executable by a computer. A computer within the context of this application may be any device comprising a computer-readable medium having stored thereon instructions and at least one general processing unit adapted to execute the instructions stored on the computer-readable medium. The computer readable medium may be, for example, but is not limited to, an electronic, magnetic, optical, electromagnetic, infrared, or semiconductor system, apparatus, device, or propagation medium. More specific examples of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

When compiling the source code 101, the compiler 102 creates test case selection tuples 112 from test case selection rules. Each test case selection tuple 112 comprises a mask, a comparison value set and a test case reference. In one embodiment of the present disclosure, all test case selection tuples comprise different test case selection references, i.e.,  no test case will be referenced more than once by the test case selection tuples 112. The test case selection tuples 112 can be stored in a test case selection table, which has a respective column for the masks, the comparison value sets and the test case selection references for each test case selection tuple. An example of a test case selection table is shown in FIG. 2 and its use will be discussed below.

In one example embodiment, source code 101 can further define rules for the configuration of the terminal. Based on these rules, the compiler 102 generates the configuration code rules 111.

In one embodiment, the configuration code rules 111 define which aspects of the configuration of the terminal are to be comprised in the configuration code and which part of the configuration code relates to which aspect. If, for example, the configuration code is a bitmap, the configuration code rules can define which aspect relates to which bit. In this example, if the bit is 0, the aspect is not present in the configuration of the terminal, whereas a 1 would indicate that the aspect is part of the configuration of the terminal. It is, however, also possible to use a pre-defined convention instead of the configuration code rules which assigns the aspects of the configuration to each corresponding bit.

Additionally or alternatively, the configuration code rules can further define possible configuration codes for the terminal and comprise at least one configuration suggestion tuple. Each tuple comprises a partial code and a suggested configuration value. The partial code represents a configuration of the terminal and is based on possible configurations thereof. The partial code therefore is a set of possible aspects of the configuration, such as a terminal located in the European Union, accepting MasterCard®, Visa® and AMEX® but not capable of contactless payment. The suggested configuration value can provide a full configuration of a terminal based on the partial code. In one embodiment, the suggested configuration value can be a proposed configuration. For example, a partial code might indicate that a terminal is located in a country, in which the payment terminals usually work with all common credit card brands. Consequently, the suggested configuration value will suggest a configuration code indicating that the terminal is capable of being used with all common credit card brands. In a further embodiment, the suggested configuration value can provide an unchangeable, mandatory configuration code. For example, if the partial code indicates that a terminal is located in the United States, the suggested configuration value can require that the configuration code of a terminal is set to only read the magnetic strip of credit cards, not the smart chip as credit cards issued in the United States regularly do not include smart chips. In yet a further embodiment, the suggested configuration value indicates aspects of the configuration which are not required to be specified. For example, a certain country might not require minimum or maximum amounts for certain kinds of payments executed on a terminal, thus any aspect pertaining to transaction amounts are not required to be specified and are indicated as such by the suggested configuration value.

In yet a further embodiment, the configuration code rules 111 can comprise at least one critical configuration tuple. Each critical configuration tuple comprises a partial code and a critical configuration value. The partial code is similar to the partial code as described above with regard to the configuration suggestion tuple. The critical configuration value is based on the partial code and indicates a configuration which results in a warning. In yet a further embodiment, the configuration value can also indicate an invalid configuration. For example, it might be required that contactless payments are limited to $25. Therefore, a critical configuration tuple could comprise a partial code indicating a transaction limit for contactless payments of $30. The critical configuration value of this exemplary configuration tuple could then indicate a warning or, alternatively, a prohibited configuration.

These configuration code rules optimize the generation of the configuration code since they can shorten the time spent defining the aspects of the configuration of the terminal since only the first part of the configuration code needs to be generated. The rest is generated automatically from the suggested configuration tuple. The configuration code rules 111 also make the configuration code generation more robust by issuing a warning or preventing entirely erroneous configuration codes.

The source code 101 can further define the list of all test cases 113. The instructions to test the possible aspects of the configuration and the order of the instructions can be defined in the source code. The compiler 102 then generates an instruction set and a test case reference for each defined order of instructions and combines all test cases in the list of all test cases 113.

The test case selection table 112 and the optional configuration code rules 111 can be used by a test case selection program 120 to select the test cases to be executed by the terminal.

The test case selection program 120 comprises a user interface 121 and a test case selection logic 122. The user interface 121 provides questions which allow a user to select from configuration options of the terminal. These questions can in one embodiment be based on the configuration code rules 111 described above. Based on the suggested configuration value and critical configuration value, certain answers to questions will result in suggestions of possible configurations, in mandatory configurations, in questions being marked as being not required to be answered or in messages indicating a warning or a prohibited configuration. Based on the answers provided by the user, a configuration code 123 is generated by the test case selection program 120.

The test case selection logic 122 selects the test cases to be executed 124 based on the test case selection tuples 112 generated by the compiler 102. To select the test cases, the test case selection logic 122 applies the configuration code 123 to the test case selection table 112 as will be explained below with reference to FIGS. 2 and 3.

While the test case selection table 112 has been described as output generated by the compiler 102 and defined by the source code 101, they can also be provided, for example, manually and/or in the form of spreadsheets. Furthermore, while the test case selection table 112 generated by the compiler 102 has been described as being used by test case selection program 120, the test cases to be selected could also be determined by applying the configuration code 123 manually to the test case selection table 112. In this case, the configuration code could also be created manually. Finally, while the test case selection program 120 may be implemented as one single program comprising a user interface 121 and a selection logic 122 as integrated components, these two components may also be standalone programs, where the selection logic 122 takes as an input the test case selection table 112 the configuration code 123, the configuration code being generated, e.g., by the user interface 121.

The use of a test case selection table for determining the test cases to be executed for a specific terminal will now be described with regard to FIGS. 2 and 3.

FIG. 2 shows an exemplary test case selection table 122. Each row in the test case selection table 122 represents a test case selection tuple. The table of FIG. 3 shows in its first column a configuration code, and in its second and third columns the results of applying the configuration code to tuples in the test case selection table of FIG. 2. A configuration code represents the configuration of the terminal. It comprises one or more entries, and each entry represents one aspect of the configuration of the terminal.

In the example embodiment of FIG. 3, the configuration code is a bitmap, and each entry of the configuration code consists of one bit representing a Boolean fact relating to (i.e., one aspect of) the configuration of the terminal. The mask and the comparison value set of each case selection tuple comprised by the case selection table of FIG. 2 are also bitmaps, and they have the same length (4 bits) as the configuration code bitmap. Each value of the mask and each value of the comparison value set consists of one bit. It should be noted, however, that the disclosure is not limited to the use of bitmaps for configuration codes, masks, and/or comparison value sets.

For each test case selection tuples, the mask (comprised in the first column of the test case selection table of FIG. 2) is used for identifying the entries of the configuration code which are to be compared with the corresponding comparison value set (comprised in the second column of the test case selection table). This identification is performed by applying Boolean AND to each value of the mask and each corresponding entry of the configuration code. The second column of the table of FIG. 3 shows the result of this use of the mask.

For example, applying the mask in the first row of the table of FIG. 2 (i.e., of the first case selection tuple) to the configuration code leads to the result in the second column of the first row of FIG. 3 ('0000'). Since all values of this mask are zeroes, which means that none of the entries of the configuration code is to be compared with the comparison value set, the result also comprises only zeroes. This result is identical to the comparison value set of the first case selection tuple (comprised in the second column of the first row of the test case selection table 122), and therefore the test case referenced by the test case reference of the first test case selection tuple (Test Case 3) is in scope. A mask comprising only zeroes and a corresponding comparison value set also only comprising zeroes indicate a default test case since this combination of mask and comparison value set will always result in the test case reference being in scope.

In the second test case selection tuple, comprised by the second row of the test case selection table, (only) the third value of the mask is 1, which means that (only) the third entry of the configuration code should be compared with the respective value in the comparison value set. Using this mask leads to the result shown in the second column of the second row of the table of FIG. 3 ('0010'). In this example, as the result and the comparison value set (comprised in the second column of the second row of the test case selection table of FIG. 2) are identical and, the referenced test case (Test Case 1) is in scope.

The mask of the third test case selection tuple is identical to the mask of the second test case selection tuple; hence the result of applying the mask to the configuration code is the same ('0010'). However, the comparison value set of the third test case selection tuple is different. Thus, the test case referenced by the test case reference of the third test case selection tuple (Test Case 4) is not in scope.

Finally, the mask of the fourth test case selection tuple indicates that all entries of the configuration code with the exception of the second entry are to be identified for comparison. Using this mask with the configuration code results in '0011'. Since this result is identical to the comparison value set of the fourth test case selection tuple, the test case referenced by the test case reference of this tuple (Test Case 2) is in scope.

In summary, the example configuration code of FIG. 3 compared with the exemplary test case selection table of FIG. 2 results in the selection of three different test cases.

To determine the test cases to be executed for a specific terminal, the mask of each test case selection tuple 112 is used to identify the entries of the configuration code which are to be compared with the corresponding comparison value set. Thus, the mask of the test case selection tuple 112 identifies the aspects of the configuration code which are to be tested by the test case and the corresponding comparison value set indicates whether a corresponding aspect of the configuration code can be tested by the test case referenced to by the test case reference of each test case selection tuple 112. For example, the mask of the test case selection tuple 112 can identify the aspects of the configuration code relating to the brands of payment cards (for example MasterCard®, American Express®, Visa®) to be used for payment with the terminal. The corresponding comparison value set indicates whether the test case referenced to by the test case reference can test any one of these brands of payment cards. After using the mask for identifying the entries of the configuration code, the values of the identified entries are compared with the respective values of the comparison value set. If each of the values of the identified entries corresponds to the respective value of the comparison value set, the test case referenced to by the test case reference is selected for execution on the terminal.

In the above described case that the configuration code is a bitmap, the entries of the configuration code which are to be compared can be identified by applying Boolean AND to each value of the mask and each corresponding entry of the configuration code. Also, the values of the identified entries of the configuration code can be compared to the respective values of the comparison value set by applying a Boolean comparison to each identified entry and each respective value.

Figure 4:
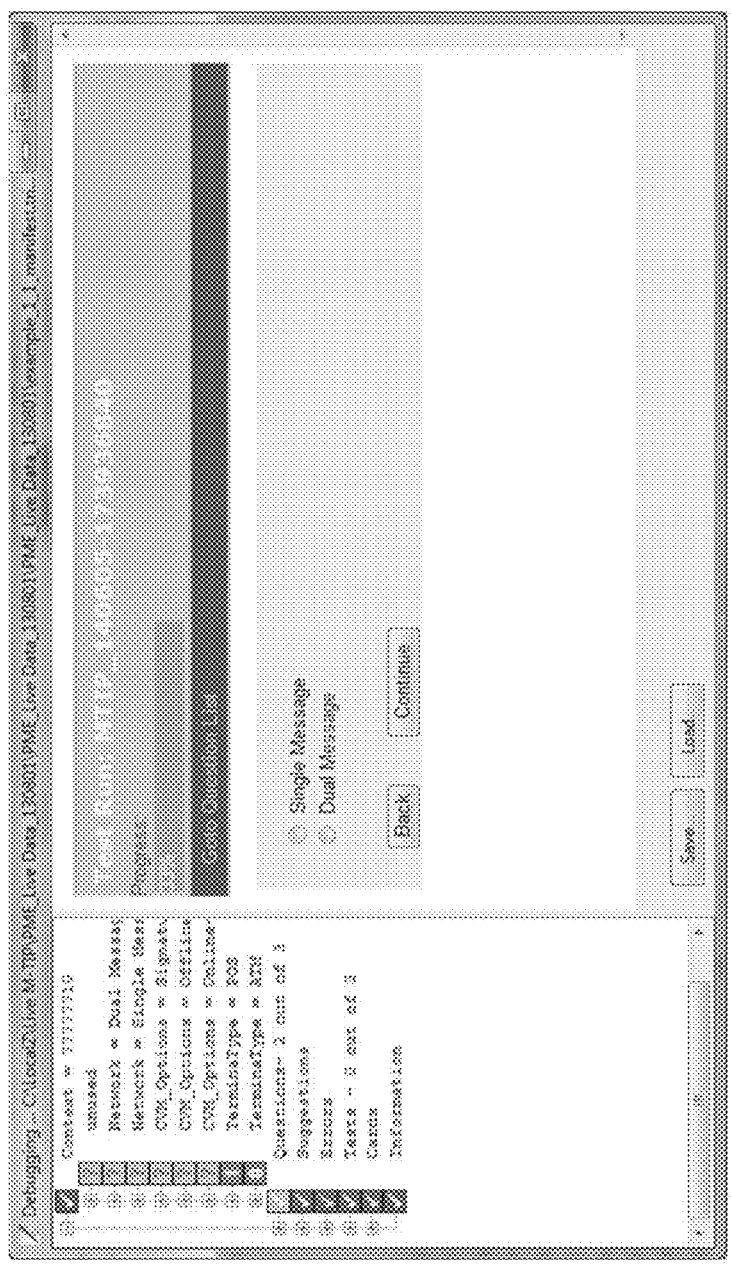
FIG. 4 shows an exemplary user interface of the test case selection program.

FIG. 4 shows an exemplary user interface of the test case selection program. A main window displays the questions whose answers define the configuration code. A side window to the left of the main window shows which bits of the configuration code have already been defined. Below the configuration code, the side window displays how many questions have already been answered and how many of the test cases are in scope. Additionally, the side window can display suggested and erroneous configuration codes based on the configuration code rules 111.

Figure 5:
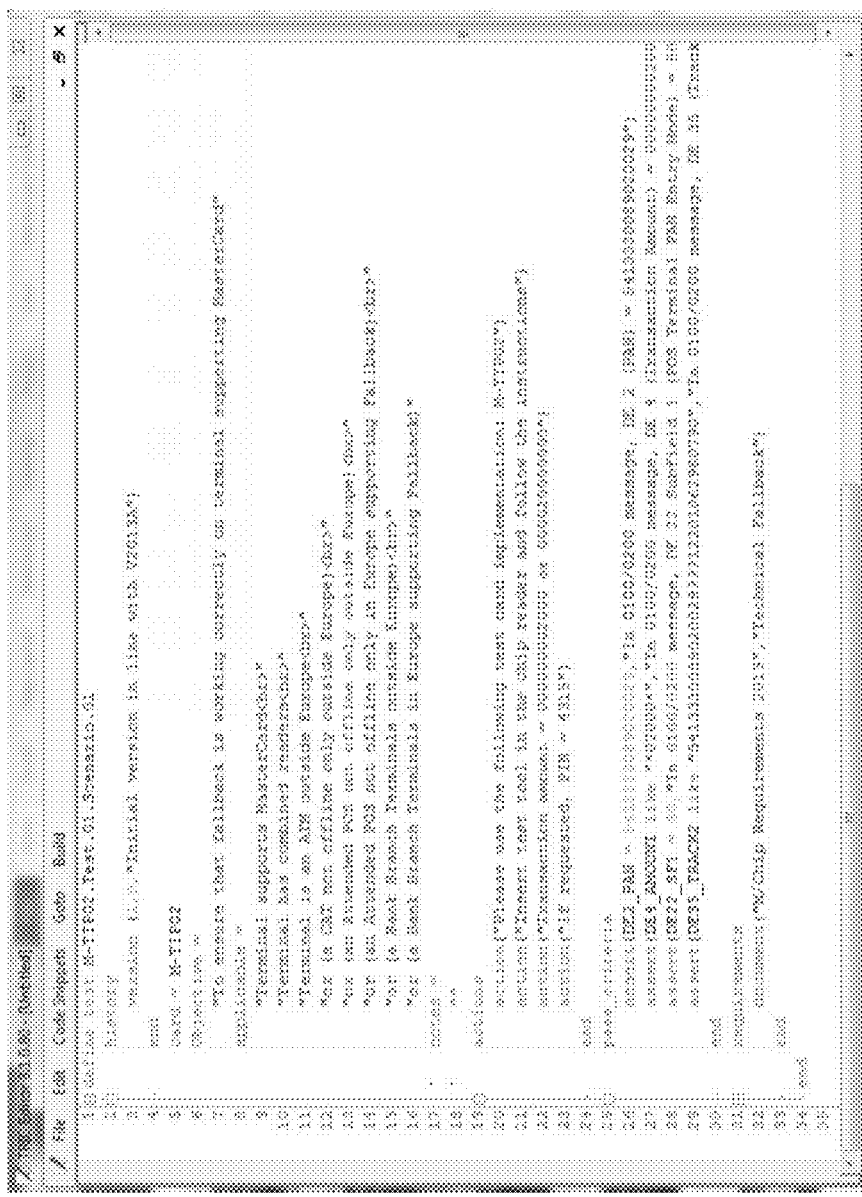
FIG. 5 shows an example of a test case defined using a source code.

FIG. 5 shows an example of a test case definition using a source code. In this example, a payment terminal is tested for compliance with a credit card issued by MasterCard®.

In the "applicable" section the test case definition defines when the test case should be run. In this particular case the test case should be run on terminals which support MasterCard®, are attended, i.e., located in a store and used or supervised by staff of the store or are located in banks. Furthermore, the terminal should either be located outside Europe or within Europe if a certain condition applies.

The "actions" section then defines the actions which are to be performed by the test case performer. In the example provided by FIG. 5, the actions include which card is to be used for the test, which payment amount should be entered and, if applicable, which PIN should be used.

Finally, the "pass_criteria" section checks if messages received by the payment terminal in response to the actions performed correspond to the values defined in the "pass_criteria" section.

It should be appreciated that the functions and/or steps and/or operations described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Further, it should be appreciated that one or more aspects of the present disclosure transform a general-purpose computing device into a special-purpose computing device when configured to perform the functions, methods, and/or processes described herein.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the exemplary embodiments herein are only examples, and are not intended to limit the scope, applicability, operation, or configuration of the disclosure in any way. It will be further appreciated by a person skilled in the art that numerous variations and/or modifications may be made to one or more of the above-described embodiments without departing from the spirit or scope of the disclosure as broadly described in the appended claims. The above-described embodiments are, therefore, to be considered in all respects to be illustrative and not restrictive.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

What is claimed is:

1. A computer-implemented method for selecting test cases to be executed on a terminal, the method comprising:
   creating a configuration code representing a configuration of the terminal, wherein the configuration code includes a bitmap having one or more bit entries, where each of the bit entries represents a Boolean fact relating to the terminal configuration;
   applying the configuration code to a set of test case selection tuples, wherein each of the test case selection tuples comprises a mask, a corresponding comparison value set and a test case reference for a test case; and
   for each of the test case selection tuples in the set:
      identifying, using the mask, the one or more bit entries of the configuration code which are to be compared with the corresponding comparison value set;
      comparing, via a Boolean operator, the values of the identified one or more bit entries with respective values of the corresponding comparison value set; and
      selecting the test case for execution on the terminal if each of the values of the identified one or more bit entries corresponds to the respective values of the comparison value set.

2. The computer-implemented method of claim 1, wherein the Boolean operator includes AND.

3. A computer-implemented method for creating a set of test case selection tuples for selecting test cases to be executed on a terminal, wherein each test case selection tuple comprises a mask, a corresponding comparison value set and a test case reference, the method comprising:
   taking as an input a source code which defines configuration code rules and test case selection rules for selecting test cases for a terminal, wherein the configuration code rules define which aspects for a configuration of the terminal are to be comprised in a configuration code and which part of the configuration code relates to which of the aspects, and wherein the test case selection rules determine the test cases to be executed on the terminal in dependence on the configuration of the terminal; and
   compiling the source code, wherein the set of test case selection tuples is generated as an output and stored, the mask of each test case selection tuple for identifying one or more bit entries of a bitmap of a configuration code for a terminal, and the identified one or more bit entries to be compared, via a Boolean comparison, with respective values of the corresponding comparison value set.

4. The method according to claim 3, wherein the source code further defines the test cases and wherein compiling the source code further generates the test cases as an output.

5. The method according to claim 3, wherein the source code is written in a programming language specifically designed for defining options for the configuration of a terminal and rules for selecting the test cases for the terminal in dependence on the configuration of the terminal.

6. A computer-implemented method for operating a test case selection program having a user interface and a selection logic, the method comprising:
   providing, through the user interface, questions which allow a user to define a configuration of a terminal;
   receiving user input defining the configuration of the terminal;
   creating a configuration code representing the configuration of the terminal based on the user input, the configuration code including a bitmap, where each of multiple bit entries in the bitmap represents a Boolean fact relating to the configuration of the terminal;
   applying the configuration code to a set of test case selection tuples, wherein each of the test case selection tuples comprises a mask, a corresponding comparison value set and a test case reference for a test case; and
   for each of the test case selection tuples in the set:
      identifying, using the mask, one or more of the bit entries of the configuration code which are to be compared, via a Boolean operator, with respective values of the corresponding comparison value set; and
      selecting the test case for execution on the terminal when each of the values of the identified one or more of the bit entries corresponds to the respective values of the comparison value set.

7. The computer-implemented method of claim 6, further comprising, for each of the test case selection tuples in the set, comparing, via the Boolean operator, the values of the identified one or more of the bit entries with the respective values of the corresponding comparison value.

8. The computer-implemented method of claim 6, wherein the Boolean operator includes AND.

* * * * *